United States Patent [19]
Doi et al.

[11] 3,932,331
[45] Jan. 13, 1976

[54] METHOD FOR RAPID HARDENING OF ASPHALT EMULSIONS
[75] Inventors: Tadashi Doi, Osaka; Isao Sekido, Wakayama; Ryoichi Tamaki, Arita, all of Japan
[73] Assignee: Kao Soap Co., Ltd., Tokyo, Japan
[22] Filed: Nov. 6, 1974
[21] Appl. No.: 521,522

[30] Foreign Application Priority Data
Nov. 9, 1973  Japan.............................. 48-126030

[52] U.S. Cl. ........... 260/28; 260/28.5 AS; 427/138; 427/426
[51] Int. Cl.$^2$.......................................... C08L 91/00
[58] Field of Search ....... 260/28, 28.5 AS; 427/426, 427/138

[56] References Cited
UNITED STATES PATENTS
3,179,610  4/1965  Wood ................................... 260/28

Primary Examiner—Melvyn I. Marquis
Attorney, Agent, or Firm—Woodhams, Blanchard and Flynn

[57] ABSTRACT

Asphalt emulsions are rapidly hardened by incorporating therein an isocyanate-terminated urethane prepolymer formed by reacting one equivalent of the OH group of a polyalkylene glycol having the following formula

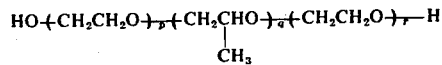

$$\text{CH}_3$$

wherein $p + r \geq q$, $q \geq 0$, $p \geq 1$, $r \geq 1$ and $20 \leq p + q + r \leq 100$, with 1.1 to 2.0 equivalents of the NCO group of an organic diisocyanate.

7 Claims, No Drawings

METHOD FOR RAPID HARDENING OF ASPHALT EMULSIONS

BACKGROUND OF THE INVENTION

1. Field of the Invention

This invention relates to a method for rapidly breaking and hardening an asphalt emulsion by incorporating therein a water-soluble urethane prepolymer.

Surfaces of roads are abraded and worn by tire chains and studded snow tires, by heavy cars and trucks that travel thereon and by the effects of weather. Accordingly, with the increase of the amount of asphalt-paved roads, development of excellent repair and resurfacing binders for asphalt-paved roads has been demanded. It is preferred that such repair binders satisfy the following requirements. Namely, they should be liquid at ambient temperature about 10° to 35°C. and they should be appliable so as to form a layer having a thickness not exceeding 5 mm. After paving, they should show high resistance and durability against impacts, shocks and abrasions, and they should have a stickiness or adhesiveness, both to the existing asphalt road surface and to aggregate, so as to bond tightly the aggregate incorporated therein for rendering the road surface non-slippery. Further, they should harden rapidly so that the repaved road can be opened for motor traffic within about one hour after repaving.

2. Description of the Prior Art

As the conventional methods for hardening asphalt emulsions, there are known: a method in which, for example, an anionic surface active agent is incorporated into a cationic asphalt emulsion; a method in which a polyvalent metal ion such as calcium ion is added to an emulsion containing a soap as an emulsifier to thereby form a metal soap; and a method in which an acid stronger than a carboxylic acid is added to destroy or reduce the emulsifying activity of the soap used as an emulsifier. According to these conventional methods, the asphalt emulsion is broken, but the composition thereafter exists in a viscous mud-like state for a long time and it takes a long time for the composition to exhibit a sufficient bonding activity. Further, although the resurfaced road can be opened to motor traffic after a relatively short time, because the asphalt emulsion does not attain a sufficient stickiness to aggregate within a short time, scattering of the aggregate placed thereon occurs for a time period after opening of the paved road to motor traffic. Accordingly, if it is intended to form a skid-preventive surface on the paving, the aggregate for improving traction and preventing skids becomes scattered and the intended effect cannot be fully obtained. Therefore, according to the conventional hardening methods, an asphalt emulsion is used principally as binders for blacktopping compositions.

SUMMARY OF THE INVENTION

It is therefore a primary object of this invention to provide an asphalt emulsion hardening method which is much improved in comparison with the above-mentioned conventional hardening methods. The method of this invention is characterized by the feature that a special water-soluble urethane prepolymer is incorporated into an asphalt emulsion. According to the method of this invention, the resurfaced road, driveway or parking lot can be opened to motor traffic within about one hour after the paving or resurfacing treatment is completed, even though an asphalt emulsion which is a liquid material is employed as the resurfacing material. The invention provides an improved asphalt composition capable of holding tightly aggregate incorporated therein for improving traction.

More specifically, in accordance with this invention, there is provided a method for effecting the rapid hardening of asphalt emulsions characterized by incorporating into a road-resurfacing or seal-coating emulsion, an isocyanateterminated urethane prepolymer formed by reacting a polyalkylene glycol having the following formula

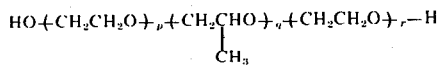

wherein $p + r \geq q$, $q \geq 0$, $p \geq 1$, $r \geq 1$ and $20 \leq p + q + r \leq 100$, with an organic diisocyanate, at a ratio of 1.1 to 2.0 equivalents of the NCO groups of said organic diisocyanate, per one equivalent of the OH groups of said polyalkylene glycol, thereby to cause the asphalt emulsion to harden rapidly.

As the polyalkylene glycol represented by the above formula I, which is one starting material for preparing the urethane prepolymer to be used in this invention, there can be mentioned, for example, polyethylene glycol having a molecular weight of 1000 or 2000, a block copolymer having a molecular weight of 1500 which is formed by adding ethylene oxide to both the terminal ends of polypropylene glycol having a molecular weight of 750, and a block copolymer having a molecular weight of 1500 which is formed by adding ethylene oxide to both the terminal ends of polypropylene glycol having a molecular weight of 500. The polyalkylene glycol used in this invention is limited to those within the scope of the above formula I because the reaction product of such a polyalkylene glycol and an organic diisocyanate possesses a self-dispersing property and such reaction product can be dissolved or dispersed in water. In contrast, a urethane prepolymer formed by using a low-molecular-weight polyol such as polyethylene glycol having a molecular weight of 600 is not satisfactory because the urethane prepolymer obtained therefrom does not have a sufficient hydrophilic property. Further, a urethane prepolymer obtained by using a polyol having a high molecular weight such as 6000, as a starting reactant, is not satisfactory because the NCO group percentage of the resulting reaction product is low and a sufficiently rapid hardening effect cannot be obtained.

As regards propylene oxide-ethylene oxide block copolymers, wherein q in formula I is greater than zero, it is not satisfactory to use a copolymer in which the molar percent of propylene oxide is larger than the molar percent of ethylene oxide, because the resulting urethane prepolymer has a reduced water-solubility.

As the organic diisocyanate used for preparation of a urethane prepolymer according to this invention, there can be mentioned, for example, aromatic diisocyanates such as tolylene diisocyanate, diphenylmethane diisocyanate, naphthalene diisocyanate and xylylene diisocyanate, and aliphatic diisocyanates such as hexamethylene diisocyanate, tetramethylene diisocyanate and trimethylhexamethylene diisocyanate.

The urethane prepolymer used in this invention is prepared by reacting (A) 1 equivalent, based on the OH groups, of a polyalkylene glycol having the above formula I, with (B) 1.1 to 2.0 equivalents, preferably 1.1 to 1.5 equivalents, based on the NCO groups, of an organic diisocyanate such as those mentioned above. The reaction is generally conducted at 50° to 150°C., preferably 80° to 120°C., until the prescribed amount of the NCO group is incorporated in the reaction product, preferably for about 1 to about 5 hours.

The asphalt emulsion used in this invention can be either cationic or anionic. As is well known, such emulsions are of the oil-in-water type. However, in order to improve the stickiness of the emulsion to aggregate, it is preferred to use a cationic asphalt emulsion. For example, an asphalt emulsion prepared by using a cationic emulsifier such as an ethylene oxide adduct of an alkylamine or its quaternary ammonium salt and an acid salt of an alkylamine is preferred. Because the surface of a road is to be repaired so that it will possess an anti-skid property, it is indispensable that the asphalt emulsion should have a stickiness sufficient to hold and bond the aggregate tightly. For this purpose, it is preferred to employ a cationic rubber asphalt emulsion, namely, a mixture of a cationic asphalt emulsion and a synthetic rubber latex.

The asphalt emulsion used in this invention includes such rubber-asphalt emulsions. As is well known in the art, road-paving or seal-coating asphalt emulsions are prepared by emulsifying, in water, asphalt together with an emulsifying agent. A wide variety of road-paving and seal-coating asphalt emulsions are known in the art and can be used in this invention. Most of these asphalt emulsions contain 55 to 65% by weight of asphalt.

According to this invention, the urethane prepolymer is incorporated into the asphalt emulsion in an amount of 1 to 35% by weight, preferably 5 to 20% by weight, based on the weight of the emulsion (before addition of the prepolymer). The asphalt emulsion rapidly hardens after the urethane prepolymer is blended therein, normally within about one hour.

When the amount of the urethane prepolymer incorporated in the asphalt emulsion is smaller than 1% by weight, based on the emulsion, the desired adhesive or sticking property is not attained in a short time, and when the amount of the urethane prepolymer is larger than 35% by weight, a large quantity of carbon dioxide gas is generated which causes excessive foaming so that the paving layer becomes spongy and this sponginess cannot be removed even under pressing by a heavy roll.

According to this invention, the water-soluble urethane prepolymer reacts with water in the asphalt emulsion to form an elastic gel structure which simultaneously generating carbon dioxide gas. At the time of formation of the gel, the properties of the water in the emulsion are changed thereby to break rapidly the asphalt emulsion. In other words, when the urethane prepolymer is added to the asphalt emulsion, the emulsion is broken at the same rate as the rate of reaction between the urethane prepolymer and water. Since the time required for completion of this reaction is shorter than 10 minutes, the paved road can be opened for motor traffic in a very short time. Further, the polyurethane resin formed by this reaction is homogeneously integrated with and distributed in the asphalt whereby there is obtained a paving asphalt having improved properties.

In the rapid hardening method of this invention, the sticking power of the asphalt emulsion is manifested rapidly in a very short time, and therefore, the method of this invention can be applied effectively for repairing or repaving of various roads including national roads and superhighways where there is much traffic. It is also useful as a seal-coating for driveways and parking lots.

The urethane prepolymer is incorporated in the liquid asphalt emulsion immediately before or during application of the asphalt emulsion to the existing asphalt paving. For example, the asphalt emulsion and the liquid polyurethane prepolymer can be simultaneously sprayed through separate spraying nozzles, with the spraying nozzles for the emulsion and the prepolymer being arranged so that the sprays mix with each other whereby the urethane prepolymer becomes substantially uniformly distributed throughout the emulsion.

The thus-applied layer can form the exterior surface layer of the asphalt paving. Alternatively, loose aggregate can be applied thereon or another asphalt paving layer containing aggregate can be applied thereon while the thus-applied layer is still tacky, in which case the thus-applied layer obtained by the method of the invention acts as a binder between the original paving and the aggregate or the final asphalt paving layer.

This invention will now be described in more detail by reference to the following illustrative Examples.

EXAMPLE 1

A urethane prepolymer was added, in the amounts indicated in Table 1, to a cationic asphalt emulsion prepared by compounding 60 parts by weight of asphalt having a penetration of 180 to 200, with 40 parts by weight of water, 0.5 part by weight of beef tallow-alkyl-propylene diamine, 0.6 part by weight of 35% hydrochloric acid and 0.15 part by weight of calcium chloride. The urethane prepolymer and asphalt emulsion were mixed and applied to a substrate by spraying them simultaneously. The urethane prepolymer was prepared, in advance, by reacting 1 equivalent of polyethylene glycol having a molecular weight of 1000, which had been dehydrated and dried under reduced pressure, with 1.2 equivalents of tolylene diisocyanate (2,4-isomer/2,6-isomer ratio = 80/20) at 110°C. for 2 hours.

For comparison, an aqueous solution containing 10% of sodium hydroxide was used in an amount of 5% by weight, based on the asphalt emulsion, and both the aqueous solution and asphalt emulsion were mixed by spraying them simultaneously.

The time required for breaking of the emulsion, the time required for stickiness to be manifested in the asphalt, the compactness of the binder and the tensile strength of the binder were measured. The results shown in Table 1 were obtained.

Table 1

| Amount of Urethane Prepolymer Added to Emulsion (% by weight) | Time required for breaking of Emulsion[1] | Time Required for Stickness to be Manifested[2] | Compactness of Binder[3] | Tensile Strength of Binder[4] (Kg/cm$^2$) |
|---|---|---|---|---|
| 0 (control) | more than 60 minutes | more than 60 minutes | good | 0.5 |
| 1 | just after spraying | more than 60 minutes | good | 0.5 |

Table 1-continued

| Amount of Urethane Prepolymer Added to Emulsion (% by weight) | Time required for breaking of Emulsion[1] | Time Required for Stickness to be Manifested[2] | Compactness of Binder[3] | Tensile Strength of Binder[4] (Kg/cm$^2$) |
| --- | --- | --- | --- | --- |
| 5 | just after spraying | 3 minutes | good | 0.8 |
| 10 | just after spraying | 2 minutes | good | 1.0 |
| 20 | just after spraying | 2 minutes | good | 1.0 |
| 30 | just after spraying | 2 minutes | good | 1.0 |
| 50 (control) | just after spraying | 1 minute | bad | 0.3 |
| 10% sodium hydroxide in an amount of 5% based on emulsion (control) | just after spraying | more than 60 minutes | good | 0.5 |

[1] The time required for the asphalt emulsion to be broken to the mud-like state. Measurement was conducted at 20°C. with a sample paved in a thickness of 5 mm.
[2] The time required for the mud-like asphalt emulsion to be converted to the stringing stickiness-manifesting state.
[3] A sample paved in a thickness of 5 mm was allowed to stand still at 20°C. for 7 days, and when the resulting binder sample in which the stickiness had been completely manifested was touched with a finger, if the binder was free of a spongy touch, the compactness was evaluated as "good".
[4] A sample which had been aged under the conditions described in 3 above was roll-pressed under a pressure of 0.7 Kg/cm$^2$, and the tensile strength was measured according to the method of JIS K-6301.

EXAMPLE 2

An asphalt emulsion having a composition as shown below was mixed with the same urethane prepolymer as used in Example 1 by conducting simultaneous spraying in the same manner as in Example 1. The results obtained were substantially the same as those obtained in Example 1. When a 10% aqueous solution of calcium chloride was used in an amount of 20% by weight, based on the emulsion, instead of the urethane prepolymer, and they were mixed by simultaneous spraying, the results obtained were substantially the same as those obtained by using sodium hydroxide in Example 1.

| Composition of Asphalt Emulsion Used | |
| --- | --- |
| Component | Amount (parts by weight) |
| Asphalt having a penetration of 180 to 200 | 60 |
| Water | 40 |
| Soap | 0.6 |

EXAMPLE 3

3 Parts by weight of hardened beef tallow-alkylmethyl dipolyoxyethylene ammonium chloride (mole number (P̄) of added ethylene oxide being 50) was added at room temperature under agitation of 100 parts by weight of a styrene-butadiene rubber latex formed by emulsion polymerization using an anionic surface active agent (manufactured and sold under trade name "Rhodex" by Japanese Synthetic Rubber Co. Ltd.) to form a nonionic styrene-butadiene rubber latex. Then, polyoxyethylene N,N'-methyl-N-hardened beef tallow-alkylpropylene 1,3-diammonium chloride (mole number (P̄) of added ethylene oxide being 3) was added to asphalt in an amount of 3% by weight based on the resulting asphalt emulsion to emulsify the asphalt, and 100 parts of the resulting asphalt emulsion (asphalt/water ratio = 65/35; penetration of the asphalt being 180 to 200) was mixed with 32 parts by weight of the above non-ionic sytrenebutadiene rubber latex at room temperature (sytrene-butadiene/ asphalt ratio = 20/80) to form a stable cationic rubber asphalt emulsion.

A urethane prepolymer was used in the amounts indicated in Table 2 for the thus-obtained cationic rubber asphalt emulsion, and they were mixed by simultaneous spraying.

The urethane prepolymer used was one prepared by reacting 1 equivalent of a propylene oxide-ethylene oxide block copolymer having a molecular weight of 1500, formed by adding ethylene oxide to both the terminal ends of polypropylene glycol having a molecular weight of 750 which had been dehydrated and dried under reduced pressure, with 1.3 equivalents of diphenylmethane4,4'-diisocyanate at 120°C. for 1 hour.

For comparison, 10% sodium alkylbenzenesulfonate was used in an amount of 5% by weight, based on the asphalt emulsion, instead of the urethane prepolymer, and they were mixed by simultaneous spraying.

The thus-obtained samples were tested by the same methods as described in Example 1. The results shown in Table 2 were obtained.

Table 2

| Amount of Urethane Prepolymer Added to Emulsion (% by weight) | Time Required for breaking of Emulsion | Time Required for Stickiness to be Manifested | Compactness of Binder | Tensile Strength of Binder (Kg/cm$^2$) |
| --- | --- | --- | --- | --- |
| 0 (control) | more than 60 minutes | more than 60 minutes | good | 1.0 |
| 1 | just after spraying | more than 60 minutes | good | 1.0 |
| 5 | just after spraying | 3 minutes | good | 1.5 |
| 10 | just after spraying | 2 minutes | good | 2.0 |
| 20 | just after spraying | 2 minutes | good | 2.0 |
| 30 | just after spraying | 1 minute | good | 2.0 |
| 50 (control) | just after spraying | 1 minute | bad | 0.5 |

Table 2-continued

| Amount of Urethane Prepolymer Added to Emulsion (% by weight) | Time Required for breaking of Emulsion | Time Required for Stickiness to be Manifested | Compactness of Binder | Tensile Strength of Binder (Kg/cm²) |
| --- | --- | --- | --- | --- |
| 10% sodium alkyl-benzenesulfonate in an amount of 5% based on emulsion (control) | just after spraying | more than 60 minutes | good | 1.0 |

EXAMPLE 4

An asphalt emulsion having the composition indicated below was mixed with the same urethane prepolymer as used in Example 3 by conducting simultaneous spraying in the same manner as in Example 1. The results obtained were substantially the same as those obtained in Example 1.

For comparison, a 10% aqueous solution of hydrochloric acid was used in an amount of 15% by weight, based on the emulsion, instead of the urethane prepolymer, and the solution and emulsion were mixed by simultaneous spraying. When the resulting sample was tested, it was found that the time required for stickiness to be manifested was more than 60 minutes and the tensile strength of the binder was 0.5 Kg/cm².

| Composition of Asphalt Emulsion Used | |
| --- | --- |
| Component | Amount (parts by weight) |
| Asphalt having a penetration of 180 to 200 | 60 |
| water | 40 |
| sodium alkylbenzenesulfonate | 0.6 |

The embodiments of the invention in which an exclusive property or privilege is claimed are defined as follows:

1. A method for rapidly hardening an aqueous, oil-in-water type, cationic or anionic, road-surfacing asphalt emulsion containing from about 55 to 65 weight percent asphalt or mixture of asphalt and synthetic rubber, emulsifier and the balance is water, which comprises incorporating into said emulsion from 1 to 35 percent by weight, based on the weight of said emulsion, on an isocyanate-terminated, water-soluble, urethane prepolymer obtained by reacting an organic diisocyanate with polyalkylene glycol having the formula

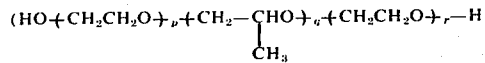

wherein $p + r \geq q$, $q \geq 0$, $p \geq 1$, $r \geq 1$, and $20 < p + q + r < 100$, at a ratio of 1.1 to 2.0 equivalents of the NCO groups of said organic diisocyanate, per one equivalent of the OH groups of said polyalkylene glycol.

2. A method as claimed in claim 1, in which the amount of said isocyanate-terminated, water-soluble, urethane prepolymer is from 5 to 20 percent by weight, based on the weight of said emulsion.

3. A method as claimed in claim 1, in which said ratio is from 1.1 to 1.5 equivalents of the NCO groups of said organic diisocyanate, per one equivalent of the OH groups of said polyalkylene glycol.

4. A method as claimed in claim 1, in which said isocyanate-terminated, water-soluble, urethane prepolymer is substantially uniformly mixed into said emulsion immediately before or during application of said emulsion to an existing asphalt paving.

5. A method as claimed in claim 4, in which said emulsion and said prepolymer are separately sprayed onto asphalt paving with the spray patterns thereof intermingling so that a thin layer of a substantially uniform mixture of said emulsion and said prepolymer is formed on said paving.

6. Asphalt paving having a surface coating layer thereon formed by applying to said asphalt paving a substantially uniform mixture of (A) an aqueous, oil-in-water type, cationic or anionic, roadsurfacing asphalt emulsion containing from about 55 to 65 weight percent of asphalt or a mixture of asphalt and synthetic rubber, emulsifier and the balance is water, (B) from 1 to 35 percent by weight, based on the weight of said emulsion of an isocyanate-terminated, water-soluble, urethane prepolymer obtained by reacting an organic diisocyanate with polyalkylene glycol having the formula

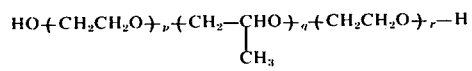

wherein $p + r \geq q$, $q \geq 0$, $p \geq 1$, $r \geq 1$, and $20 < p + q + r < 100$, at a ratio of 1.1 to 2.0 equivalents of the NCO groups of said organic diisocyanate, per one equivalent of the OH groups of said poolyalkylene glycol.

7. A rapidly hardenable road surfacing composition, consisting essentially of an aqueous, oil-in-water type, cationic or anionic, road-surfacing asphalt emulsion containing from about 55 to 65 weight percent of asphalt or mixture of asphalt and synthetic rubber, emulsifier and the balance is water, said emulsion having substantially uniformly mixed therein from 1 to 35 percent by weight, based on the weight of said emulsion, on an isocyanate-terminated, water-soluble, urethane prepolymer obtained by reacting an organic diisocyanate with polyalkylene glycol having the formula

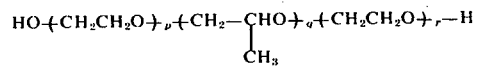

wherein $p + r \geq q$, $q \geq 0$, $p \geq 1$, $r \geq 1$, and $20 < p + q + r < 100$, at a ratio of 1.1 to 2.0 equivalents of the NCO groups of said organic diisocyanate, per one equivalent of the OH groups of said polyalkylene glycol.

* * * * *